United States Patent [19]

Tani et al.

[11] Patent Number: 4,630,142
[45] Date of Patent: Dec. 16, 1986

[54] APPARATUS FOR REPRODUCING A DIGITAL SIGNAL

[75] Inventors: Toshiyuki Tani; Yoshizumi Inazawa, both of Kanagawa; Toshihiko Takahashi, Chiba; Shigeyuki Satomura, Tokyo, all of Japan

[73] Assignee: Sony Corporation, Tokyo, Japan

[21] Appl. No.: 791,518

[22] Filed: Oct. 25, 1985

[30] Foreign Application Priority Data

Nov. 2, 1984 [JP] Japan .............................. 59-232077
Jul. 3, 1985 [JP] Japan .............................. 60-146268

[51] Int. Cl.$^4$ ............................................. G11B 5/52
[52] U.S. Cl. ................................................... 360/70
[58] Field of Search ........................................ 360/70

[56] References Cited

U.S. PATENT DOCUMENTS

| | | | |
|---|---|---|---|
| 4,021,857 | 5/1977 | Tanimura | 360/84 |
| 4,282,552 | 8/1981 | Tachi et al. | 360/70 |
| 4,322,755 | 3/1982 | Kosaila | 360/70 |
| 4,484,235 | 11/1984 | Yokobori et al. | 360/70 |
| 4,584,618 | 4/1986 | Tassery | 360/70 |

OTHER PUBLICATIONS

Doi, Channel Codings for Digital Audio Recordings, J. Audio-Eng. Soc., vol. 31, No. 4, pp. 224-238 (Apr. 1983).

Primary Examiner—George G. Stellar
Attorney, Agent, or Firm—Lewis H. Eslinger; Alvin Sinderbrand

[57] ABSTRACT

Apparatus for reproducing digital signals recorded on a recording tape comprises a rotary drum about which a recording tape can be trained, a rotary head mounted in the drum, a transport mechanism for transporting the tape over the drum and rotating the head so that a relative speed is established between the head and the tape and the head scans the tape and generates reproduced digital signals in response to digital signals recorded on the tape, and a mode-control mechanism for controlling the transport mechanism so that the tape is transported over the drum at an absolute tape speed that can be varied. A servomechanism responsive to variations in the absolute tape speed adjusts the transport mechanism so that the head acquires a rotary speed such that the relative speed is restored to and maintained at a substantially constant value, not withstanding changes in the absolute tape speed effected under the control of the mode-control mechanism.

7 Claims, 29 Drawing Figures

APPARATUS FOR REPRODUCING A DIGITAL SIGNAL

BACKGROUND OF THE INVENTION

1. Field of the Invention

This invention relates to an apparatus for reproducing a digital signal and, more particularly, to novel and highly-effective apparatus for reproducing a digital signal recorded on a tape by a rotary head.

2. Description of the Prior Art

Apparatus for recording and reproducing a digital signal is known, in which an analog signal such as an audio signal or the like is converted to a digital signal; a digital signal indicative of an address, a program number and the like together with the converted digital signal is recorded by a rotary head on a tape that is transported at a normal speed; the digital signal thus recorded is reproduced from the tape transported at the normal speed; the reproduced digital signal is converted to an analog signal such as an audio signal; and the recorded address, program number and the like are confirmed. For example, European patent application No. 0092403, filed by the assignee of the present application and published on Oct. 26, 1983, discloses such apparatus for recording and reproducing a digital signal. In the conventional recording and reproducing apparatus, it is required that, even when the tape is transported at high speed, a part of the digital signal such as address signal and program number recorded on the tape be reproduced by the rotary head to confirm the position of the information recorded on the tape and to control the operation of the tape. However, when the tape is transported at high speed, if the rotary head is rotated at normal speed, the relative speed between the tape and the head becomes different from that in the normal playback mode. Thus it becomes difficult to reproduce the digital signal recorded on the tape.

OBJECTS AND SUMMARY OF THE INVENTION

An object of this invention is to provide an improved apparatus for reproducing a digital signal, particularly a digital signal recorded on a tape by a rotary head.

Another object of the invention is to provide an improved apparatus for reproducing a digital signal which includes means for controlling the relative speed between a tape and a rotary head to become substantially the same as that in the normal playback mode, even when the tape runs at high speed.

According to one aspect of the present invention, there is provided apparatus for reproducing digital signals recorded on a recording tape; the apparatus comprising: a rotary drum about which a recording tape can be trained; rotary head means mounted in the drum; transport means for transporting the tape over the drum and rotating the head means so that a relative speed is established between the head means and the tape and the head means scans the tape and generates reproduced digital signals in response to digital signals recorded on the tape; mode-control means for controlling the transport means so that the tape is transported over the drum at an absolute tape speed that can be varied; and servo means responsive to variations in the absolute tape speed for adjusting the transport means so that the head means acquire a rotary speed such that the relative speed is restored to and maintained at a substantially constant value, notwithstanding changes in the absolute tape speed effected under the control of the mode-control means.

BRIEF DESCRIPTION OF THE DRAWINGS

A better understanding of the objects, features and advantages of the present invention can be gained from the following detailed description of the preferred embodiments thereof, in conjunction with the accompanying drawings, wherein like reference characters designate the same elements and parts, and wherein:

FIG. 1 (formed of FIGS. 1A and 1B with FIG. 1A to the left of and partly overlapping FIG. 1B) is a block diagram of a preferred embodiment of apparatus for reproducing a digital signal according to the invention;

FIG. 9 (formed of FIGS. 9A and 9B with FIG. 9A to the left of and partly overlapping FIG. 9B) is a block diagram of another preferred embodiment of apparatus for reproducing a digital signal according to the invention;

DESCRIPTION OF THE PREFERRED EMBODIMENTS

Figure 1A:
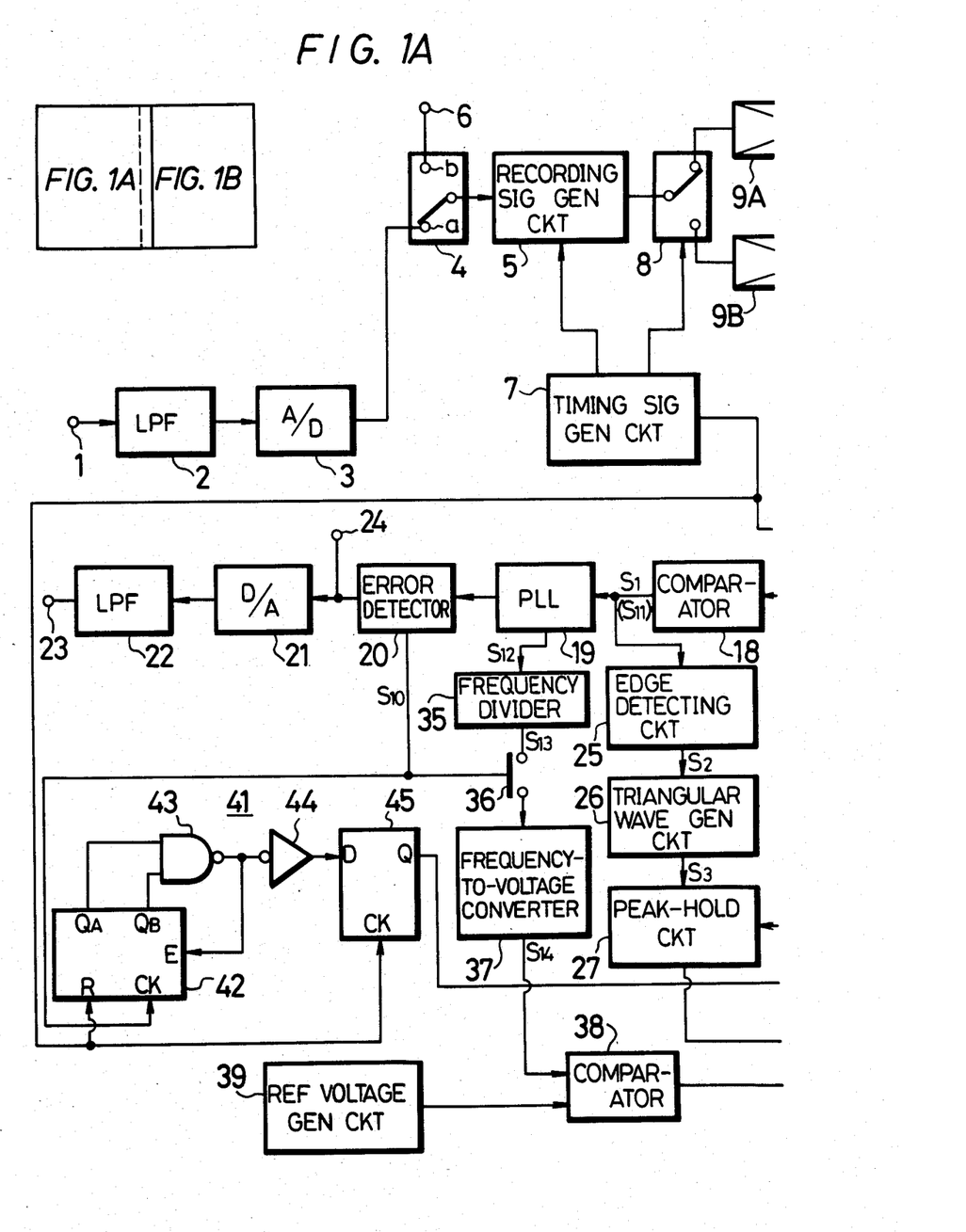
Figure 1B:
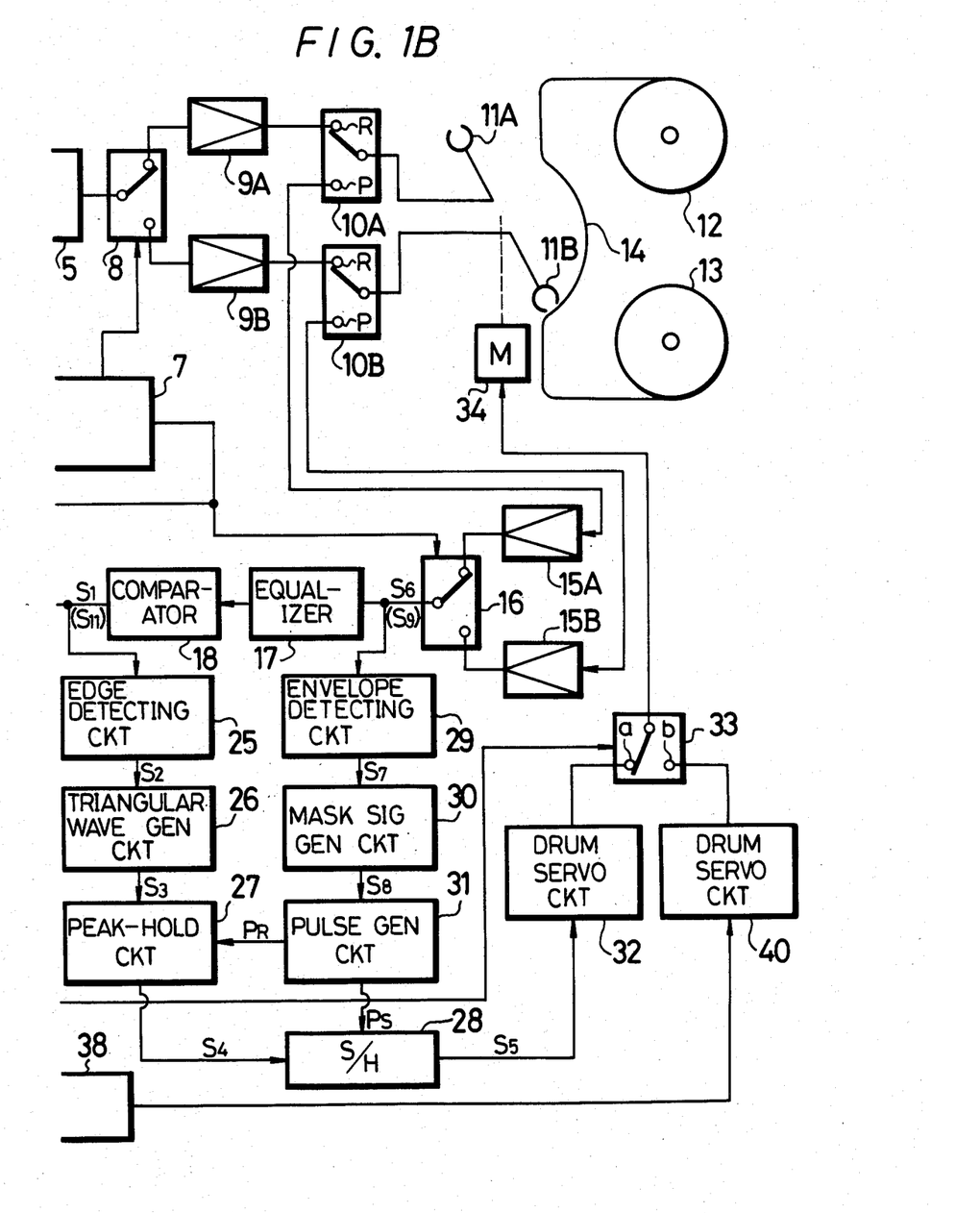

FIG. 1 (formed of FIGS. 1A and 1B) is a block diagram of a circuit for a preferred embodiment of apparatus for reproducing a digital signal according to this invention. An analog signal, for example an audio signal applied to an input terminal 1, is supplied through an LPF (low-pass filter) 2 to an A/D (analog-to-digital) converter 3 in which it is converted from an analog signal to a digital signal. The digital output of the A/D converter 3 is supplied through a contact a of a switching circuit 4 to a recording signal generating circuit 5. Alternatively, it is possible to supply the digital signal from a terminal 6 directly to the recording signal generating circuit 5 by changing the position of the switching circuit 4 to its contact b.

In addition, though not shown, signals such as an address signal, a program number signal and so on are supplied to the recording signal generating circuit 5. In the recording signal generating circuit 5, signal processing such as the addition of an error correction code to the data, processing of the data in such a manner as to interleave it, modulation and so on are carried out in response to a timing signal from a timing signal generating circuit 7. The data signal is then supplied to a switching circuit 8. The switching circuit 8 is used to switch in the rotary heads 11A and 11B (FIG. 1B) at the proper times and is alternately changed in position by the switching signal from the timing signal generating circuit 7 during a first half-revolution interval including the tape contact period of the head 11A and during a second half-revolution interval including the tape contact period of the head 11B. A pulse of 30Hz indicative of the rotary phase of the rotary heads 11A and 11B is generated by a pulse generator (not shown in FIG. 1 but shown in FIG. 9 as 51) and supplied to the timing signal generating circuit 7 in synchronism with the revolution of a motor for driving the rotary heads 11A and 11B. The signal from the switching circuit 8 which is changed in position by the switching signal from the timing signal generating circuit 7 is amplified by amplifiers 9A and 9B and then supplied through contacts R of switching circuits 10A and 10B to the rotary heads 11A and 11B and thereby recorded on a magnetic tape 14 that is wound around and stretched between reels 12 and 13. The switching circuits 10A and 10B are connected to the contacts R upon recording and are connected to contacts P upon reproducing, respec- tively.

Amplifiers 15A and 15B are respectively supplied with the reproduced outputs from the corresponding rotary heads 11A and 11B when the switching circuits 10A and 10B are changed in position to the contacts P upon playback. The outputs from these amplifiers 15A and 15B are both fed to a switching circuit 16. Similarly to the recording mode, the switching circuit 16 is alternated between its two positions by the switching signal of 30 Hz from the timing signal generating circuit 7 so that it is alternately in one position during the half-rotation interval including the tape contact period of the head 11A and in the other position during the half-rotation interval including the tape contact period of the head 11B.

The output signal S6 switched by the switching circuit 16 is supplied through an equalizer 17, a comparator 18 and a PLL (phase-locked loop) circuit 19 to an error detecting/correcting circuit 20 in which the error thereof is detected and, if necessary, corrected. The resultant signal is supplied to a D/A (digital-to-analog) converter 21 in which it is converted from a digital signal to an analog signal. This analog signal is then supplied through a low-pass filter 22 to an output terminal 23 as an original analog output signal.

It is also possible to derive the digital data directly from a terminal 24 provided at the output of the error detecting circuit 20. From the error detecting circuit 20, there are reproduced an address signal, a program number and the like (not shown).

An edge detecting circuit 25 detects the leading edge and the trailing edge of the signal pulse produced at the output of the comparator 18, i.e. the reproduced digital signal. On the basis of the signal detected by the edge detecting circuit 25, a triangular wave generating circuit 26 generates a triangular wave. The peak of this triangular wave is detected by a peak-hold circuit 27 and then fed to an S/H (sample-and-hold) circuit 28.

An envelope detecting circuit 29 is provided at the output of the switching circuit 16, and, on the basis of the output of the envelope detecting circuit 29, a mask signal generating circuit 30 generates a mask signal for masking a period in which no data is obtained, such as when the rotary heads 11A and 11B do not trace the tape 14 (as will be described later). The mask signal S8 produced by the mask signal generating circuit 30 is supplied to a pulse generating circuit 31. The pulse generating circuit 31 sequentially produces a sampling pulse PS and a reset pulse PR during the period t2 (FIG. 5C) of the mask signal S8. The reset pulse PR is supplied to the peak-hold circuit 27 and the sampling pulse PS is supplied to the sample-and-hold circuit 28. Thus the output S4 from the peak-hold circuit 27 is sampled by the sampling pulse PS in the S/H circuit 28. Thereafter, the peak-hold circuit 27 is reset by the reset pulse PR from the pulse generating circuit 31 and the peak-hold circuit 27 is set in the mode to hold the peak value of the next output S3 from the triangular wave generating circuit 26.

The signal S5 sampled and held by the S/H circuit 28 is fed to a drum servo circuit 32 as relative speed information. The drum servo circuit 32 controls via a switching circuit 33 a motor 34 which rotates the drum (not shown) to which the rotary heads 11A and 11B are attached.

A frequency divider 35 divides the frequency of the reproduced clock signal S12 generated from the reproduced digital data in the PLL circuit 19 by a predetermined ratio. The output S13 from the frequency divider 35 is supplied through a switch 36 (first switching means) to an F/V (frequency-to-voltage) converting circuit 37 in which it is converted from a frequency signal to a voltage signal S14. The switch 36 is controlled by an error check output signal S10 (FIGS. 1A and 6B) produced by the error detecting circuit 20. When an error occurs, the error check output signal assumes, for example, a high level, and the switch 36 is turned on. The voltage signal S14 from the converting circuit 37 is supplied to one input terminal of a comparator 38, in which it is compared with a reference voltage supplied to the other input terminal thereof from a reference voltage generating circuit 39. A compared error signal from the comparator 38 is supplied to a drum servo circuit 40 as the relative speed information and the motor 34 is selectively controlled by this drum servo circuit 40 via the switch circuit 33. The apparatus of this invention thus includes two drum servo systems one of which is the servo system including the drum servo circuit 32 and components associated therewith and the other of which is the servo system including the drum servo circuit 40 and components associated therewith. The two drum servo systems are properly switched in response to the relative speed between the heads 11A and 11B on the one hand and the tape 14 on the other, as described below.

A second switching means 41 (FIG. 1A) is provided to change over the switching circuit 33 provided at the outputs of the drum servo circuits 32 and 40. The switching means 41 is operated in such a manner that, when the relative speed between the heads 11A and 11B and the tape 14 deviates significantly from a set value or the reproduced data and the reproduced clock are not synchronized with each other, the switching means 41 produces an output signal of low level by which the switching circuit 33 is switched to its contact a; while, when the relative speed is sufficiently close to the set value or the reproduced data and the reproduced clock are synchronized with each other, it produces an output signal of high level by which the switching circuit 33 is switched to its contact b.

By way of example, the switching means 41 is formed of a counter 42, a NAND circuit 43, an inverter 44 and a D-type flip-flop circuit 45. The signal (switching pulse) that is supplied to the switching circuit 16 by the timing signal generating circuit 7 is supplied also to a reset terminal R of the counter 42 and to a clock terminal CK of the flip-flop circuit 45. In synchronism with, for example, the trailing edge of this switching pulse, the counter 42 is reset and the flip-flop circuit 45 latches the input data. The outputs from output terminals QA and QB of the counter 42 are respectively supplied to the input terminals of the NAND circuit 43. The output from the NAND circuit 43 is supplied to an enable terminal E of the counter 42 and, through the inverter 44, to an input terminal D of the flip-flop circuit 45. When the signal supplied to the enable terminal E of the counter 42 is high, the counter 42 carries out the count operation; and when this signal is low, the counter 42 stops counting. The output from an output terminal Q of the flip-flop circuit 45 is supplied to the switching circuit 33 to control the state thereof.

FIGS. 2 to 8 show the operation of the circuit shown in FIG. 1.

Figure 2:
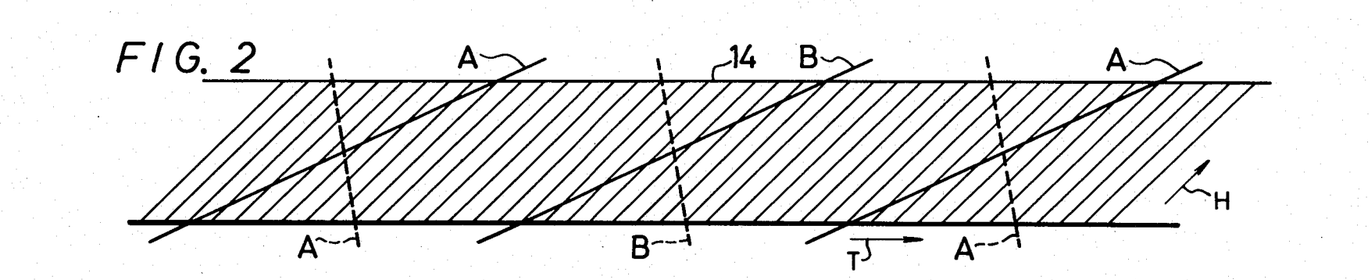
FIG. 2 is a diagram showing loci of a rotary head with respect to magnetic tape on which signals are recorded and from which they are reproduced.
Figure 3:
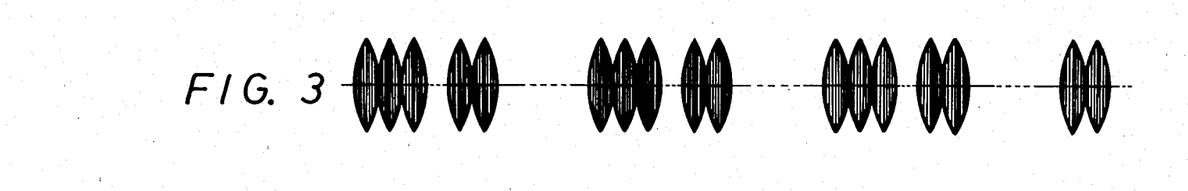
FIG. 3, FIGS. 4A to 4G, FIGS. 5A to 5C, FIGS. 6A and 6B, FIGS. 7A and 7B, and FIGS. 8A and 8B are respectively timing charts showing the operation of the reproducing apparatus of FIG. 1.
Figure 4A:
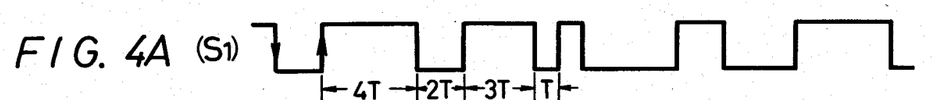

When the reproducing apparatus is in the fast-forward mode, the loci of the rotary heads 11A and 11B become as shown by broken lines A and B in FIG. 2. When the reproducing apparatus is in the rewind mode, the loci of the rotary heads 11A and 11B become as shown by solid lines A and B in FIG. 2. The general direction of movement of the rotary heads 11A and 11B relative to the tape is indicated by an arrow H, and the direction of movement of the tape 14 is indicated by an arrow T in FIG. 2. Since the heads 11A and 11B produce outputs from tracks whose azimuths are coincident with those of the heads but produce essentially no outputs from tracks whose azimuths are not coincident with those of the heads, the heads generate reproduced signals whose waveforms are a so-called bead-shape as shown in FIG. 3. When the reproduced signal is passed through the equalizer 17 and the comparator 18, the comparator 18 generates a reproduced digital signal S1 of a square waveform as shown in FIG. 4A. The period (and thus the frequency) of this square waveform signal S1 changes in accordance with the magnitude of the relative speed between the heads 11A, 11B and the tape 14. Accordingly, since, as described later, the relative speed corresponding to the signal S1 from the comparator 18 is detected and servo control is applied to the drum motor 34 through the drum servo circuit 32 in accordance with the magnitude of the relative speed, the relative speed of the heads 11A and 11B with respect to the tape 14 can be controlled to be made constant, notwithstanding changes in the speed of the tape 14.

Figure 4B:
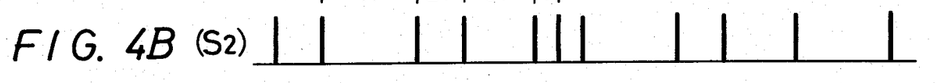
Figure 4C:
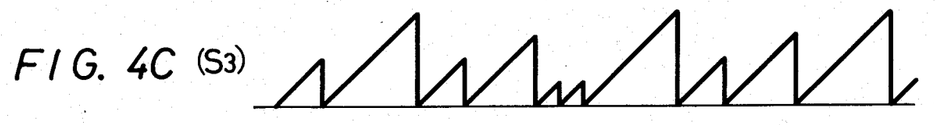
Figure 4D:
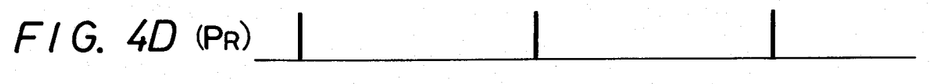
Figures 4E, 4F:
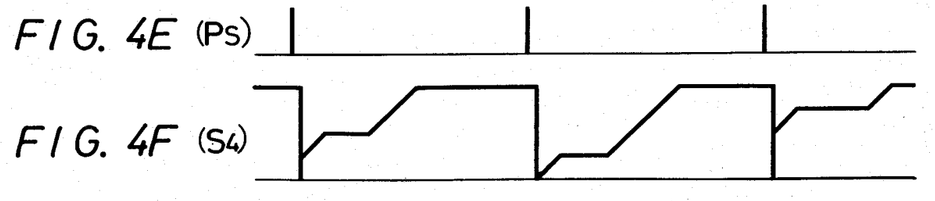
Figure 4G:
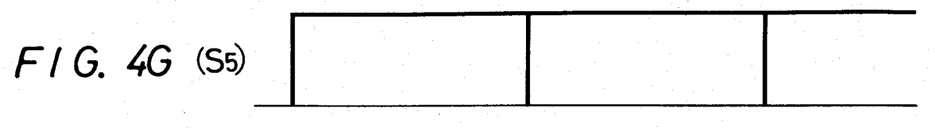

When the relative speed of the heads 11A and 11B with respect to the tape 14 deviates significantly from the predetermined value, the deviation is detected and the detected deviation is minimized by the servo system including the drum servo circuit 32. As FIG. 4A shows, the reproduced digital output signal S1 from the comparator 18 is formed of four periods or intervals T, 2T, 3T and 4T, where T is taken as a fundamental period. The reproducing apparatus of the invention employs a modulation system in which the minimum transition interval (Tmin) is T and the maximum transition interval (Tmax) is 4T. The leading edge and the trailing edge of the output signal S1 from the comparator 18 are detected by the edge detecting circuit 25, which produces therefrom a signal S2 of narrow width as shown in FIG. 4B. The detected signal S2 is supplied to the triangular wave signal generating circuit 26, in which a triangular wave signal S3 is formed. The Signal S3 gradually rises from the occurrence point of the signal S2, as shown in FIG. 4C. The triangular wave signal S3 is supplied to the peak-hold circuit 27, which holds the peak value of the signal S3 and produces a signal S4 shown in FIG. 4F. The signal S4 from the peak-hold circuit 27 is supplied to the sample-and-hold circuit 28 in which the signal S4 is sampled by a sampling pulse PS (FIG. 4E) from the pulse generating circuit 31. The sampled value is held by the circuit 28. As a result, the sample-and-hold circuit 28 produces at its output a signal S5 shown in FIG. 4G. The operating cycle of the sample-and-hold circuit 28 is set to a predetermined length of time, for example a length of time sufficient to ensure that at least one maximum transition interval of duration 4T out the output of the comparator 18 is included in each sample interval. The peak-hold circuit 27 is periodically reset by the reset pulse PR (FIG. 4D) produced by the pulse generating circuit 31. Accordingly, the output signal S4 of the peak-hold circuit 27 changes as shown in FIG. 4F.

The level of the voltage sampled and held in the sample-and-hold circuit 28 or the signal S5 substantially corresponds to the time width 4T (Tmax) in FIG. 4A. Accordingly, if the relative speed of the heads 11A and 11B with respect to the tape 14 becomes too low and the output frequency becomes correspondingly low, the time width 4T (Tmax) increases and the sampled-and-held voltage increases correspondingly. On the contrary, if the relative speed of the heads 11A and 11B with respect to the tape 14 becomes too high and the output frequency becomes correspondingly high, the time width 4T (Tmax) diminishes and the sampled-and-held voltage diminishes correspondingly. Thus the sampled-and-held voltage corresponds directly to the relative speed between the heads 11A and 11B and the tape 14, and the sampled-and-held voltage or the signal S5 can be regarded as the relative speed information. The relative speed information thus obtained has the signal waveform shown in FIG. 4G. Since the signal S5 produced at the output of the sample-and-hold circuit 28 is supplied to the drum servo circuit 32 as the relative speed information and feedback is applied to the drum motor 34 from the drum servo circuit 32, the relative speed between the tape and the rotary heads 11A and 11B can be maintained constant, notwithstanding variations in the speed of the tape 14. In view of the servo control described above, the motor (not shown) for driving the reels 12 and 13 need not be controlled with a servo but may be driven simply by a constant voltage.

Figures 5A, 5B:
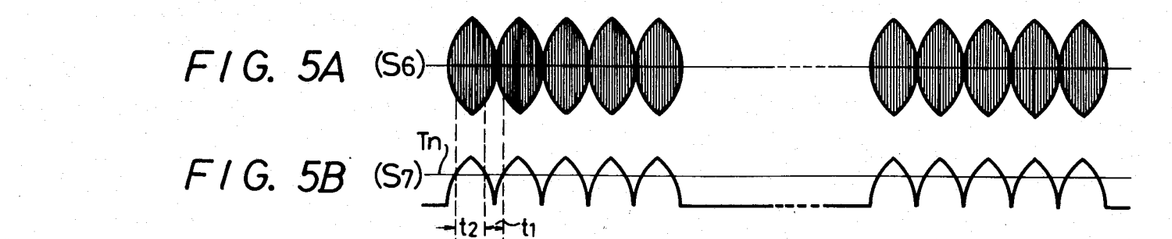
Figure 5C:
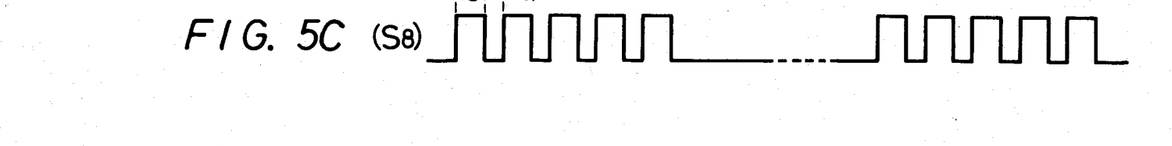

In the fast-forward or rewind mode, the output of bead-shaped waveform (FIG. 3) is produced by the heads 11A and 11B, but a head 11A or 11B whose azimuth is not coincident with that of a track being scanned at a particular time produces no output, so that at that time, the comparator 18 can not produce at its output the square waveform signal S1. Accordingly, at such time, it is necessary to prevent the sampling pulse PS (FIG. 4E) and the reset pulse PR (FIG. 4D) from being produced. To this end, an output S6 produced at the output of the switching circuit 16 and shown in FIG. 5A is supplied to the envelope detecting circuit 29, which generates therefrom a signal S7 shown in FIG. 5B. The output signal S7 from the envelope detecting circuit 29 is supplied to the mask signal generating circuit 30 in which the envelope detected output S7 is reshaped with a threshold level Th as a reference. The mask signal generating circuit 30 thus produces a mask signal S8 shown in FIG. 5C. During a period t1 of the mask signal S8, when the level of the signal S7 is below the threshold level Th, the sampling pulse PS and the reset pulse PR produced by the pulse generating circuit 31 are masked. The sampling pulse PS and the reset pulse PR are produced only during the period t2 of the mask signal S8, when the level of the signal S7 exceeds the threshold level Th. In other words, the sampling pulse PS and the reset pulse PR, by which the relative speed between the heads 11A and 11B and the tape 14 is detected, are produced only during a period in which a substantial RF output is produced by the heads 11A and 11B, or only during a period in which the square wave output S1 corresponding to T to 4T is produced by the comparator 18. Thus it becomes possible to carry out the relative speed detection and control with high accuracy.

The servo system described above includes the drum servo circuit 32 and associated circuitry and employs the 4T (Tmax) pattern and is operative when the relative speed of the heads 11A and 11B with respect to the tape 14 deviates considerably from the predetermined value. A servo system including the drum servo 40 and associated circuitry and using the reproduced clock is operative when the relative speed between the heads 11A and 11B and the tape 14 comes closer to the predetermined value.

Figure 6A:
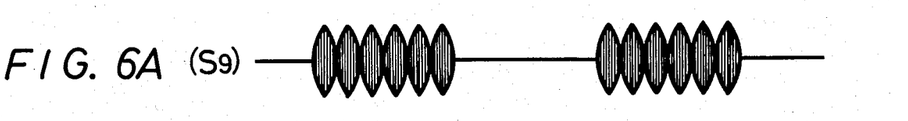
Figure 6B:
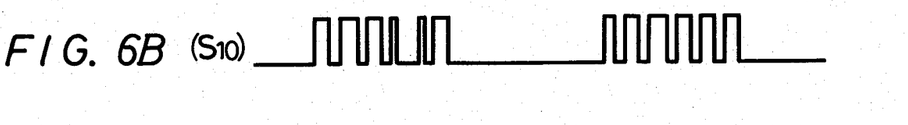
Figure 7A:
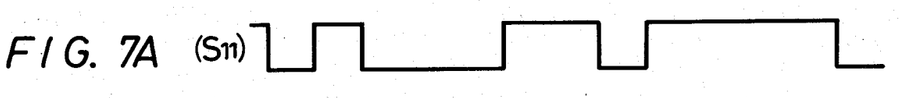
Figure 7B:
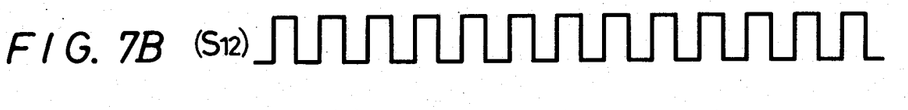
Figure 8A:
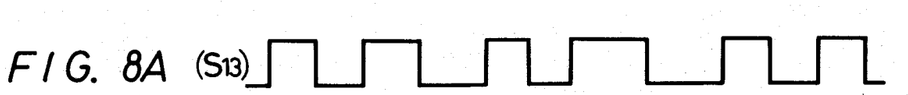

In the fast-forward mode or the rewind mode, the switching circuit 16 produces at its output a signal S9 having the bead-shaped RF waveform shown in FIG. 6A. When the signal S9 is passed through the equalizer 17 and the comparator 18, the comparator 18 produces at its output a signal (reproduced digital signal) S11 of a square waveform shown in FIG. 7A. THe signal S11 is supplied to the PLL circuit 19 which produces, if the reproduced data is correct, a reproduced clock signal S12 synchronized with the reproduced data as shown in FIG. 7B. Whether or not the reproduced data is correct can be determined by the error detecting circuit 20, which generates an error check output signal S10 shown in FIG. 6B. More particularly, when the signal S10 is high, the reproduced data is correct. Thus when this signal S10 is high, the switch 36 is closed and the frequency divider 35 supplies to the frequency-to-voltage converter 37 a reproduced clock signal S13 which is shown in FIG. 8A in an enlarged scale.

Figure 8B:
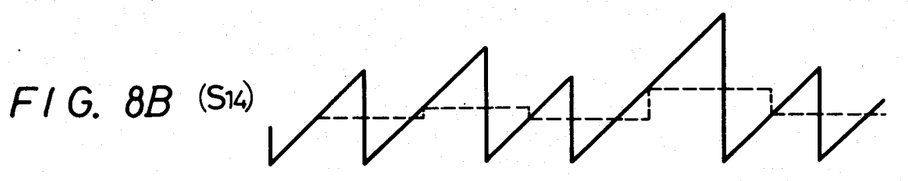

The converting circuit 37 produces internally a sawtooth waveform signal rising with a constant slope in synchronism with the leading edge of the signal S13 and which is shown by a solid line in FIG. 8B. The inclined portion of this sawtooth signal is sampled by the trailing edge of the signal S13 so that the converting circuit 37 produces at its output a signal S14 which is converted from the frequency output to the voltage signal. The waveform of the signal S14 is shown by a broken line in FIG. 8B. The level of the signal S14 increases in proportion to the period (reciprocal of the frequency) of the signal S13. In other words, as the relative speed between the heads 11A and 11B and the tape 14 increases, the period of the signal S13 becomes shorter, so that the level of the signal S14 becomes lower. On the contrary, if the relative speed between the heads 11A and 11B and the tape 14 decreases, the period of the signal S13 becomes longer, so that the level of the signal S14 becomes higher.

The voltage signal S14 from the converting circuit 37 is supplied to the comparator 38 in which it is compared with a reference voltage from the reference voltage generating circuit 39. Accordingly, the comparator 38 produces at its output a positive compared error signal when the level of the signal S14 is higher than that of the reference signal and a negative compared error signal when the level of the signal S14 is lower than that of the reference signal. The compared error signal produced by the comparator 38 is supplied to the drum servo circuit 40 as the relative speed information.

The counter 42 is reset in synchronism with the trailing edge of the switching pulse from the timing signal generating circuit 7 and sequentially counts the error check output signal S10 from the error correcting circuit 20. More particularly, if the counter 42 counts a predetermined number of, for example, three signals S10 over one period of the switching pulse from the timing signal generating circuit 7 or during the tracing period of both of the heads 11A and 11B, this is confirmation that the correct data is being reproduced, and the counter 42 produces the output "11" at the output terminals QA and QB. As a result, at the output of the NAND circuit 43, there is produced a signal of low level which is fed back to the enable input E of the counter 42 and causes the count operation of the counter 42 to stop. The signal from the NAND circuit 43 is supplied also through the inverter 44 to an input terminal D of the flip-flop circuit 45 in which it is latched at the trailing edge of the next switching pulse form the timing signal generating circuit 7. As a result, the flip-flop circuit 45 produces at its output terminal Q a signal of high level by which the switching circuit 33 is changed in position to the contact b.

Accordingly, the output from the drum servo circuit 40 is supplied through the switching circuit 33 to the motor 34. The drum servo circuit 40 causes the motor 34 to accelerate when the compared error signal from the comparator 38 is positive and to decelerate when the compared error signal is negative. In other words, the motor 34 is accelerated when the relative speed between the heads 11A and 11B and the tape 14 is lower than the predetermined value and decelerated when it is higher than the predetermined value. Thus, the relative speed between the rotary heads IIA and 11B and the tape 14 can be maintained constant.

As set forth above, when the reproduced data is not synchronized with the reproduced clock and deviates substantially from the predetermined value, the servo system including the drum servo circuit 32 and associated components is used to carry out the control, while when the reproduced data is synchronized with the reproduced clock and the relative speed between the heads 11A and 11B comes closer to the predetermined value, the servo system including the drum servo circuit 40 and associated components is used to carry out the control. It thus becomes possible to control the relative speed between the heads 11A and 11B and the tape with higher accuracy and precision.

While in the embodiment described above the reproduced data can be regarded as correct if three error check output signals are produced by the error corrector 20 during a period in which both of the heads 11A and 11B trace the tape, the present invention is not limited to that case but applies also to a case wherein the reproduced data can be regarded as correct if the error check output signals of a desired number are produced over a period in which, for example, one of the heads 11A and 11B traces the tape.

Figure 9A:
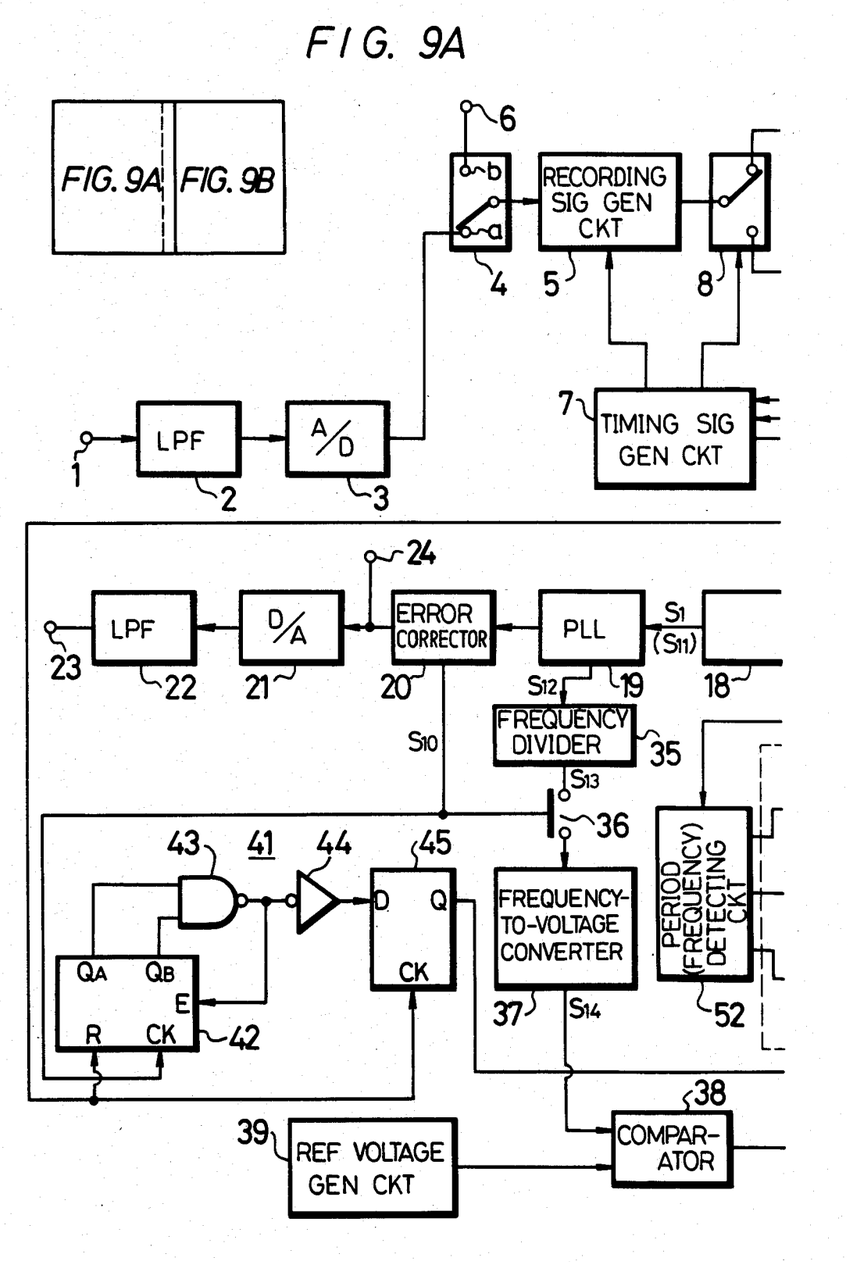
Figure 9B:
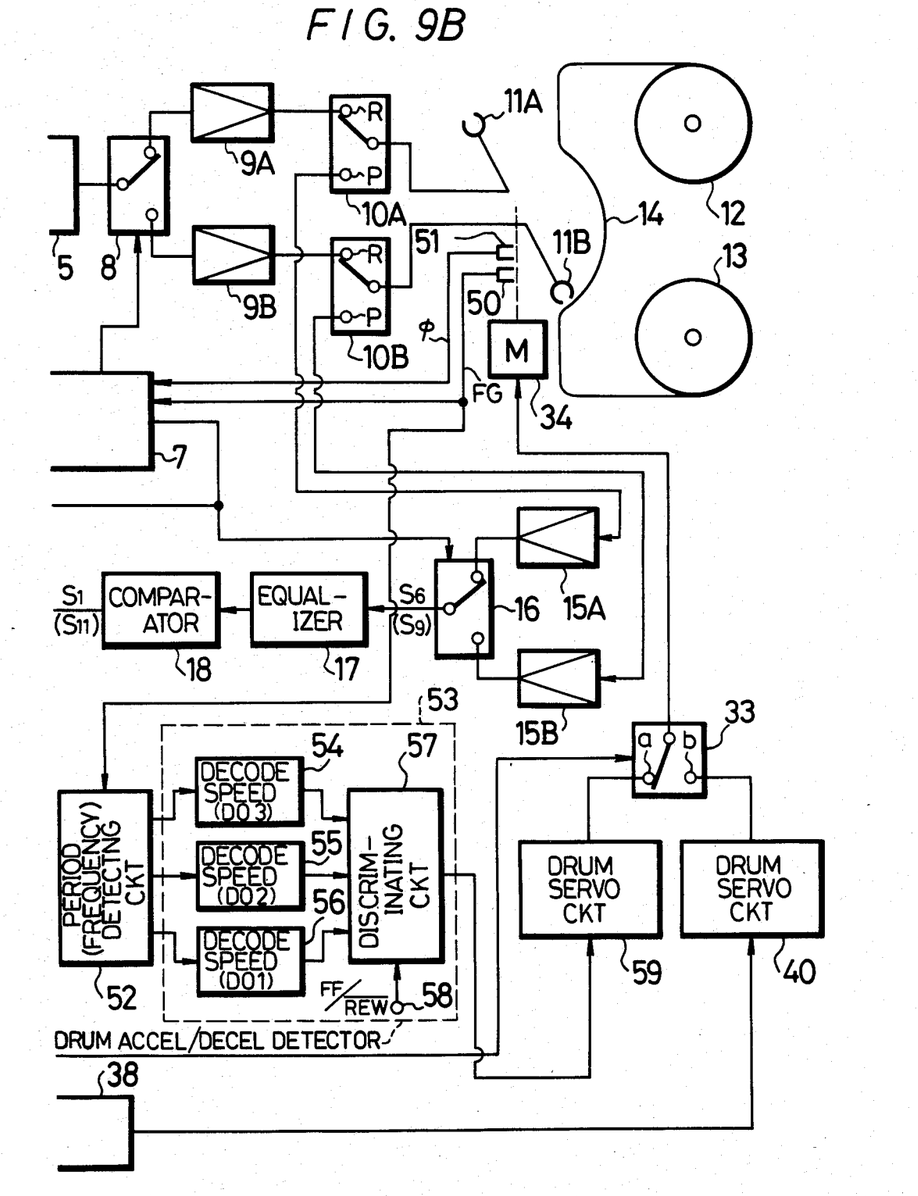

FIG. 9, consisting of FIGS. 9A and 9B arranged as described above, is a circuit block diagram showing another embodiment of the digital signal reproducing apparatus according to the present invention. In FIG. 9, parts corresponding to those of FIG. 1 are marked with the same references and are not again described in detail.

In the embodiment of FIG. 9, there are provided two drum servo systems of which one is formed of a drum servo circuit 59 and associated components and the other is formed of a drum servo circuit 40 and associated components. The circuit of FIG. 9 is thus similar in this respect to the circuit of FIG. 1.

When the relative speed between the heads 11A and 11B and the tape 14 deviates considerably from the predetermined value, a period detecting circuit 52, a drum acceleration or deceleration judging means 53 and the drum servo circuit 59 become operative.

A pulse generator 51 shown in FIG. 9 generates a pulse indicative of the rotary phase of the rotary heads 11A and 11B and supplies the pulse to the timing signal generating circuit 7. A frequency generator 50 generates a pulse FG which is proportional to the rotary speed of the drum motor 34. The frequency of the pulse FG is 800 Hz when the rotary speed of the drum is, for example, 2000 rpm and 1600 Hz when the rotary speed of the drum is, for example, 4000 rpm. The pulse FG from the frequency generator 50 is supplied to a period (frequency) detecting circuit 52 which detects the rotary speed of the drum by counting the period (frequency) of the pulse FG by means of a suitable clock. The rotary speed information from the period detecting circuit 52 is supplied to the drum acceleration or deceleration judging means 53 which extracts the acceleration information or deceleration information.

The drum acceleration or deceleration judging means 53 comprises a decoder 54 which decodes information concerning speed lower than a first speed, a decoder 55 which decodes information concerning speed having a value between the first speed and a second speed or between the second speed and a third speed, a decoder 56 which decodes information concerning speed higher than the third speed, and a discriminating circuit 57 which extracts the acceleration or deceleration information on the basis of the outputs from the decoders 54, 55 and 56. The discriminating circuit 57 is supplied from a terminal 58 with a mode switching signal for identifying the fast-forward mode (FF) mode and the rewind (REW) mode.

The output signal from the discriminating circuit 57 is supplied to a drum driving circuit (not shown) of the drum servo circuit 59 as the acceleration or deceleration information thereof. By means of the drum servo circuit 59, it is possible to control via the switch 33 the drum motor 34 that drives the drum (not shown) to which the heads 11A and 11B are attached.

In this embodiment, there are two servo systems, namely the servo system including the drum servo circuit 59 and associated components and the drum servo system including the drum servo circuit 40 and associated components. The two servo systems are properly switched in accordance with the relative speed of the heads 11A and 11B with respect to the tape 14 as described below.

The switching means 41 controls the state of the switching circuit 33 which is provided at the outputs of the drum servo circuits 59 and 40, as in the case of FIG. 1. When the relative speed of the heads 11A and 11B with respect of the tape 14 deviates substantially from the predetermined value or when the reproduced data is not synchronized with the reproduced clock, the switching means 41 produces, for example, a signal of low level to connect the movable arm of the switching circuit 33 to the contact a thereof, while when the relative speed of the heads 11A and 11B with respect to the tape 14 comes sufficiently close to the predetermined value or the reproduced data and the reproduced clock are synchronized with each other, the switching means 41 produces a signal of high level to connect the movable arm of the switching circuit 33 to the contact b thereof.

Figure 10:
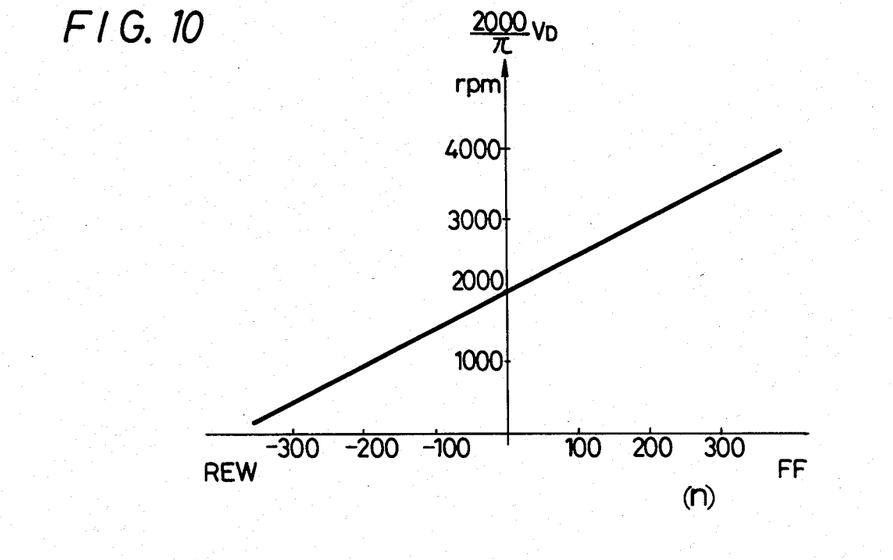
FIG. 10 is a diagram showing the relation between tape multiple speed value and the revolution speed of a rotary head when the relative speed between the tape and the rotary head is made constant.

FIG. 10 illustrates the operation of the circuit shown in FIG. 9. First, the case in which the relative speed deviates significantly from the predetermined value or the reproduced data and the reproduced clock are not synchronized with each other will be described.

The relative speed VR of the heads 11A and 11B with respect to the tape in the fast-forward and rewind modes is calculated by the following equation:

$$VR = \sqrt{(VD \cos \theta 0 - nVT)^2 + VD^2 \sin^2 \theta 0}$$
$$\simeq VD - nVT \cos \theta 0$$

wherein VD is the rotary speed of the drum, $\theta 0$ is the still angle between the head trace and the tape when the tape is stationary, n is the ratio of the tape speed in the fast-forward or rewind mode to the tape speed in the normal playback mode, and VT is the tape speed in the normal playback mode. If, for example, VR=3.13349 (mm/s), $\theta 0$=6.36667 (deg) and VT=8.15 (mm/s), then the relation between the tape multiple speed value n and the rotary speed VD of the drum is as shown in the graph of FIG. 10.

As FIG. 10 substantially shows, the rotary speed of the drum is 3283.96 rpm when n=250 and 705.7 rpm when n=−250. Accordingly, in order to lock in the relative speed to a given constant value in the fast-forward mode, when n≦250, it is sufficient to establish the rotary speed of the drum within the range of from 2000 to 3284 rpm. In the rewind mode, when n≧−250, in order to lock in the relative speed to a given constant value, it is sufficient to establish the rotary speed of the drum within the range of from 705 to 2000 rpm.

Therefore, in the period detecting circuit 52, the pulse FG from the frequency generator 50 is counted, and the rotary speed of the drum is detected. The drum rotary speed information is supplied to the decoders 54 to 56. In a practical case, the "first" speed (to which the decoder 54 is responsive) may be taken as 705 rpm, the "second" speed (to which the decoder 55 is responsive) as 2000 rpm, and the "third" speed (to which the decoder 56 is responsive) as 3284 rpm. Then, when the drum is rotated at a speed of $(2000/\pi)$VD greater than 3284 rpm (in the fast-forward mode), the output DO1 of the decoder 56 becomes "0" and the output DO2 of the decoder 55 becomes "0"; when the drum is rotated at a speed of $(2000/\pi)$VD, where 3284 rpm≧$(2000/\pi)$VD>2000 rpm, the output DO1 becomes "1" and the output DO2 becomes "0"; and when the drum is rotated at a speed of 2000 rpm ≧ $(2000/\pi)$VD, the output DO1 becomes "1" and the output D02 becomes "1". In the rewind mode, when the drum is rotated at speed greater than 2000 rpm, the output DO2 becomes "0" and the output DO3 of the decoder 54 becomes "0"; when the drum is rotated at speed of 2000 rpm≧$(2000/\pi)$>705 rpm, the output DO2 becomes "1" and the output DO3 becomes "0"; and when the drum is rotated at speed of 705 rpm≧$(2000/\pi)$VD, the output DO2 becomes "1" and the output DO3 becomes "1".

These decoded results are supplied to the discriminating circuit 57. In response to the mode switching signal supplied to the discriminating circuit 57 from the terminal 58, the discriminating circuit 57 is operated so that in the fast-forward mode, when the outputs DO1 and DO2 are both "0", a deceleration is carried out; when the output DO1 is "1" and the output DO2 is "0", the relative speed is held constant; and when outputs DO1 and DO2 are both "1", an acceleration is carried out. In the rewind mode, when the outputs DO2 and DO3 are both "0", a a deceleration is carried output; when the output DO2 is "1" and the output DO3 is "0", the relative speed is held constant; and when the outputs DO2 and DO3 are both "1", an acceleration is carried out.

On the basis of these decisions, the discriminating circuit 57 supplies the signal "1" to the drum servo circuit 59 in the case of acceleration and supplies the signal "0" to the drum servo circuit 59 in the case of deceleration. The drum servo circuit 59 accelerates or decelerates the drum motor 34 in response to these signals.

In these operations, the relative speed of the heads 11A and 11B with respect to the tape 14 arrives at a certain predetermined value without fail. At that time, the reproduced data is always synchronized with the reproduced clock. Accordingly, at that time, the switching means 41 produces the output signal of high level by which the movable arm of the switching circuit 33 is connected to the contact b thereof.

As described above, when the reproduced data is not synchronized with the reproduced clock and the relative speed deviates substantially from the predetermined value, the servo system including the drum servo circuit 59 and associated components is used to carry out the control, while when the reproduced data is synchronized with the reproduced clock and the relative speed comes sufficiently close to the predetermined value, the servo system including the drum servo circuit 40 and associated components is used to carry out the control. Thus, it becomes possible to carry out the control of the relative speed with very high accuracy and precision.

Figure 11:
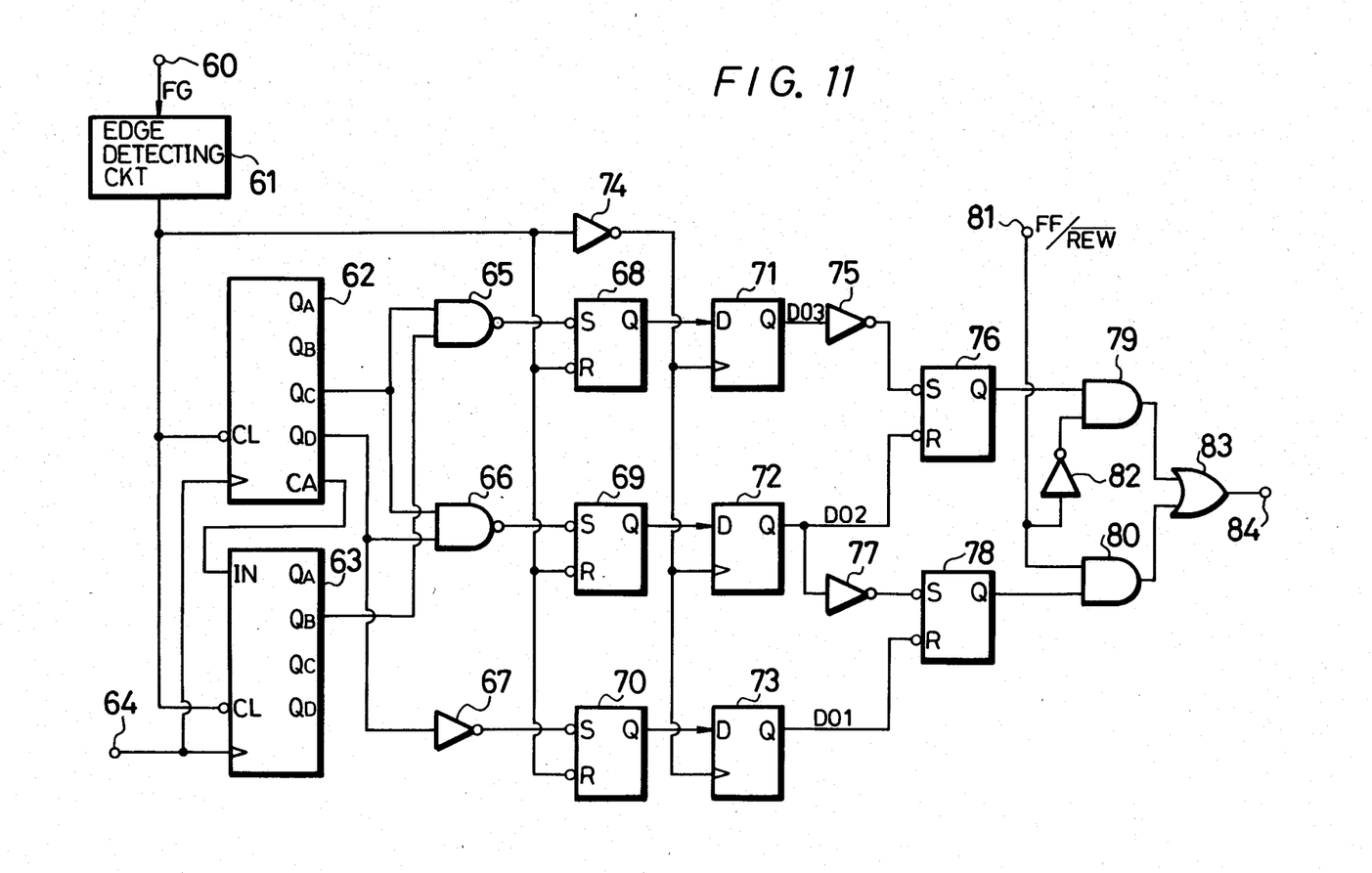
FIG. 11 is a diagram showing a practical circuit arrangement of a period detecting circuit and rotary head acceleration or deceleration judging means used in the embodiment showing in FIG. 9.

FIG. 11 is a circuit block diagram showing a preferred embodiment of the period detecting circuit 52 and the drum acceleration or deceleration judging means 53. In FIG. 11, the pulse FG from the frequency generator 50 (FIG. 9) is supplied to an input terminal 60. The pulse FG from the input terminal 60 is supplied to an edge detecting circuit 61 which detects the edge, for example the leading edge, of the pulse FG. The pulse signal from the edge detecting circuit 61 is supplied to clear terminals CL of counters 62 and 63 which are connected in cascade. The edge detecting circuit 61 and the counters 62 and 63 constitute the period detecting circuit 52 (FIG. 9). Clock terminals of the counters 62 and 63 are respectively supplied with a clock signal having a predetermined frequency, for example 10 kHz, from a terminal 64.

The counter 62 comprises output terminals QA, QB, QC and QD having weightings 1, 2, 4 and 8, respectively, and the counter 63 comprises output terminals QA, QB, QC and QD having weightings 16, 32, 64 and 128, respectively. A carry terminal CA of the counter 62 is connected to an input terminal IN of the counter 63. The output terminal QC of the counter 62 is connected to one input terminal of a NAND circuit 65 that corresponds to the decoder 54 (FIG. 9) and to one input terminal of a NAND circuit 66 that corresponds to the decoder 55 (FIG. 9). The output terminal QD of the counter 62 is connected to the other input terminal of the NAND circuit 66 and to the input terminal of an inverter 67 corresponding to the decoder 56 (FIG. 9). The output terminal QB of the counter 63 is connected to the other input terminal of the NAND circuit 65.

The NAND circuit 65, corresponding to the decoder 54, which decodes the drum rotary speed information lower than 705 rpm, opens its gate when the counters 62 and 63 count about 36 clock pulses supplied thereto from the terminal 64 during one period of the pulse FG. The NAND circuit 66, corresponding to the decoder 55, which decodes the rotary drum speed information lower than 2000 rpm, opens its gate when the counter 62 counts about 12 clock pulses supplied thereto during one period of the pulse FG. The inverter 67, corresponding to the decoder 56, which decodes the drum rotary speed information lower than 3284 rpm, produces an inverted output when the counter 62 counts about 8 clock pulses supplied thereto from the terminal 64 during one period of the pulse FG.

The outputs of the NAND circuits 65, 66 and of the inverter 67 are respectively connected to set terminals S of R-S flip-flop circuits 68, 69 and 70. Output terminals Q of the flip-flop circuits 68, 69 and 70 are respectively connected to input terminals D of D-type flip-flop circuits 71, 72 and 73. The output of the edge detecting circuit 61 is connected also to reset terminals R of the flip-flop circuits 68 to 70 and through an inverter 74 to the clock terminals of the flip-flop circuits 71 to 73.

The output DO3 of the flip-flop circuit 71 is connected through an inverter 75 to a set terminal S of an R-S flip-flop circuit 76. The output DO2 of the flip-flop circuit 72 is connected to a reset terminal R of the flip-flop circuit 76 and through an inverter 77 to a set terminal S of an R-S flip-flop circuit 78. The output DO1 of the flip-flop circuit 73 is connected to a reset terminal R of the flip-flop circuit 78. The outputs of the flip-flop circuits 76 and 78 are respectively connected to first input terminals of AND circuits 79 and 80. The second input terminal of the AND circuit 79 is connected via an inverter 82 to a terminal 81 to which the mode switching signal is applied. The second input terminal of the AND circuit 80 is connected directly to the terminal 81. The output terminals of the AND circuits 79 and 80 are respectively connected to input terminals of an OR circuit 83, which produces an output signal on an output terminal 84. The output terminal 84 is connected to the input terminal of the drum servo circuit 59 (FIG. 9). The circuit elements 68 to 83 constitute the discriminating circuit 57 (FIG. 9).

Figure 12A:
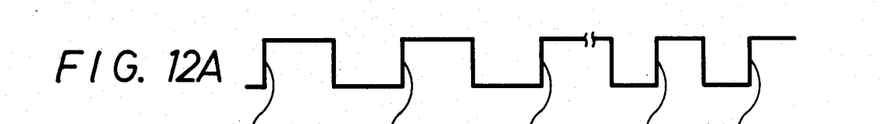
FIGS. 12A to 12E are respectively timing charts relating to the operation of the circuit shown in FIG. 11.
Figure 12B:
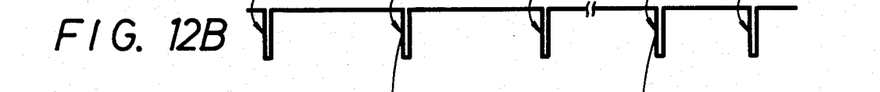

The signal waveforms of FIGS. 12A to 12E illustrate the operation of the circuit shown in FIG. 11. When a pulse FG, whose waveform is shown in FIG. 12A, is supplied from the terminal 60 to the edge detecting circuit 61, the leading edge thereof is detected thereby and the edge detecting circuit 61 produces at its output a pulse signal whose waveform is shown in FIG. 12B. When this pulse signal is supplied to the clear terminals CL of the counters 62 and 63, the counters 62 and 63 are cleared. The counters 62 and 63 then begin to count the clock pulses applied thereto from the terminal 64. As a result, the counters 62 and 63 produce the count values corresponding to the length of one period of the pulse FG. That is, the rotary speed of the drum at a desired time can be detected.

Figure 12C:
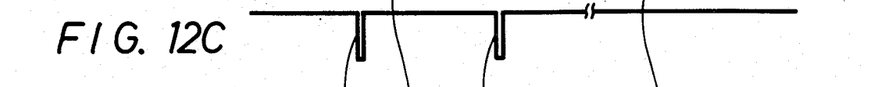
Figure 12D:
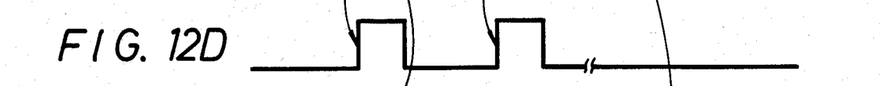
Figure 12E:
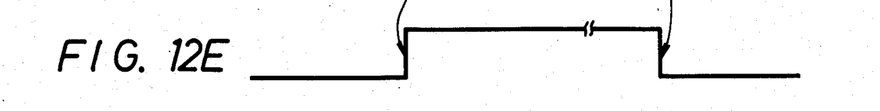

If the rotary speed of the drum is lower than 705 rpm, the NAND circuit 65 produces at its output the signal "0"; if it is lower than 2000 rpm, the NAND circuit 66 produces at its output the signal "0"; and if it is lower than 3284 rpm, the inverter 67 produces at its output the signal "0" (FIG. 12C). When the outputs of the NAND circuits 65, 66 and the inverter 67 become "0", each of the flip-flop circuits 68 to 70 produces at its output the signal "1" (FIG. 12D). When the pulse signal from the edge detecting circuit 61 is inverted by the inverter 74 and then fed to the clock terminals of the flip-flop circuits 71 to 73, the signal "1" is latched in the flip-flop circuits 71 to 73 so that the outputs of the flip-flop circuits 71 to 73 become "1" (FIG. 12E). The truth tables of the R-S flip-flop circuits 68 to 70 are shown in the following table 1.

TABLE 1

| S | 1 | 1 | 0 | 0 |
|---|---|---|---|---|
| R | 1 | 0 | 1 | 0 |
| Q | unchanged | 0 | 1 | 0 |

The outputs DO3 to DO1 of the flip-flop circuits 71 to 73 become as follows in accordance with the rotary speed of the rotary drum and the respective modes (the fast-forward mode and the rewind mode): In the fast-forward mode, if the rotary speed of the rotary drum exceeds 3284 rpm, the output DO1 of the flip-flop circuit 73 and output DO2 of the flip-flop circuit 72 both become "1"; if the rotary speed of the rotary drum is within the range of from 2000 to 3284 rpm, the output DO1 becomes "0" and the output DO2 becomes "1"; and if the rotary speed of the rotary drum is less than 2000 rpm, the outputs DO1 and DO2 both become "0". On the other hand, in the rewind mode, if the rotary speed of the rotary drum exceeds 2000 rpm, the output DO2 of the flip-flop circuit 72 and the output DO3 of the flip-flop circuit 71 both become "1"; if the rotary speed of the rotary drum is within the range of from 705 to 2000 rpm, the output DO2 becomes "0" and the output DO3 becomes "1"; and if the rotary speed of the rotary drum is less than 705 rpm, the outputs DO2 and DO3 both become "0". These relationships are classified in the following table 2.

TABLE 2

| Mode | DO1 | DO2 | DO3 | Rotary speed of drum |
|---|---|---|---|---|
| Fast | 1 | 1 | | greater than 3284 rpm |
| Forward | 0 | 1 | | 2000 to 3284 rpm |
| (FF) | 0 | 0 | | less than 2000 rpm |
| Rewind | | 1 | 1 | greater than 2000 rpm |
| (REW) | | 0 | 1 | 705 to 2000 rpm |
| | | 0 | 0 | less than 705 rpm |

The output DO3 from the flip-flop circuit 71 is supplied through the inverter 75 to the set terminals of the flip-flop circuit 76, and the output DO2 from the flip-flop circuit 72 is supplied to the reset terminal R of the flip-flop circuit 76 and through the inverter 77 to the set terminal S of the flip-flop circuit 78. The output DO1 from the flip-flop circuit 73 is supplied to the reset terminal R of the flip-flop circuit 78. The flip-flop circuits 76 and 78 are operated in accordance with the truth table of table 1. In this case, however, the flip-flop circuits 76 and 78 have no operation such that the set terminals S and the reset terminals R thereof are both "0" and the output terminals Q thereof are "0".

In the fast-forward mode, a signal of high level "1" is supplied to the terminal 81, while in the rewind mode, a signal of low level "0" is supplied thereto. Accordingly, in the fast-forward mode, the gate of the AND circuit 80 is opened to allow the output from the flip-flop circuit 78 to be delivered through the OR circuit 83 to the output terminal 84. In other words, the acceleration information is produced at the output terminal 84 when the output at the output terminal Q of the flip-flop circuit 78 is "1", while the deceleration information is produced at the output terminal 84 when the output at the output terminal Q of the flip-flop circuit 78 is "0". When the output is not changed, the preceding state of the drum is maintained. In the rewind mode, the AND circuit 79 opens its gate to allow the output at the output terminal Q of the flip-flop circuit 76 to be delivered through the OR circuit 83 to the output terminal 84. Thus the acceleration information is produced at the output terminal 84 when the output at the output terminal Q of the flip-flop circuit 76 is "1", while the deceleration information is produced thereat when the output at the output terminal Q of the flip-flop circuit 76 is "0". When the output is not changed, the preceding state of the drum is maintained.

As set forth above, in the embodiment of FIG. 9, the period (frequency) of the pulse FG proportional to the rotary speed of the rotary drum is measured; the range of the rotary speed of the rotary drum is then determined on the basis of this measured period thereby to determine the acceleration or deceleration; this acceleration or deceleration information is supplied to the drum driving circuit thereby to change the rotary speed of the rotary drum within a predetermined range so that the relative speed of the heads 11A and 11B with respect to the tape 14 arrives at the predetermined value; and servo control of the drum by means of the reproduced clock can then be established. Therefore, it is possible to control the relative speed between the tape and the head to be always constant without any problems due to dropout and the like, and notwithstanding changes in the speed of the tape.

Many modifications of the preferred embodiments of the invention described above will readily occur to those skilled in the art upon consideration of this disclosure. For example, the values of 705, 2000 and 3284 rpm, the specific circuitry employed to implement the various functions described above, and the several waveforms illustrated in the drawings can be modified or varied in accordance with the operating characteristics of different systems. Accordingly, the invention is limited only by the appended claims.

We claim:

1. Apparatus for reproducing digital signals recorded on a recording tape; said apparatus comprising:
a rotary drum about which a recording tape can be trained;
rotary head means mounted in said drum;
transport means for transporting said tape over said drum and rotating said head means so that a relative speed is established between said head means and said tape and said head means scans said tape and generates reproduced digital signals in response to digital signals recorded on said tape;
mode-control means for controlling said transport means so that said tape is transported over said drum at an absolute tape speed that can be varied; and
servo means responsive to variations in said absolute tape speed for adjusting said transport means so that said head means acquires a rotary speed such that said relative speed is restored to and maintained at a substantially constant value, notwithstanding changes in said absolute tape speed effected under the control of said mode-control means.

2. Apparatus according to claim 1; wherein said mode-control means controls said transport means so that said absolute tape speed is selectively established at a value appropriate to a playback mode, a fast-forward mode, or a rewind mode, the absolute tape speed in said fast-forward and rewind modes exceeding the absolute tape speed in said playback mode and said substantially constant value of said relative speed being appropriate to said playback mode.

3. Apparatus according to claim 1; wherein said servo means comprises two servo systems, one being operative when said mode-control means controls said transport means so that said absolute tape speed is increased and a momentary excursion of said relative speed from said substantially constant value results, and when operative causing said transport means to adjust the rotary speed of said head means so that said relative speed is restored to said substantially constant value; and the other being operative when said relative speed is at said substantially constant value and when operative causing said transport means to adjust the rotary speed of said head means so that said relative speed is maintained at said substantially constant value.

4. Apparatus according to claim 1; wherein said transport means comprises first motive means for transporting said tape over said drum and second motive means for rotating said head means, said first motive means being independent of said servo means.

5. Apparatus according to claim 1; further comprising:
clock reproducing means responsive to said digital signals for generating reproduced clock signals having a frequency proportional to said relative speed;
error detecting means responsive to said reproduced clock signals for detecting the presence or absence of error therein;
first switching means responsive to said error detecting means;
frequency-to-voltage converting means connected by said first switching means to said clock reproducing means when said error detecting means detects the absence of error in said reproduced clock signals, said frequency-to-voltage converting means then being responsive to said reproduced clock signals for producing a signal having a voltage proportional to said frequency; and
comparing means for comparing said voltage with a reference voltage and producing a compared output signal;
said servo means being responsive to said compared output signal.

6. Apparatus according to claim 5; further comprising:
second switching means responsive to detection of error by said error detecting means; and
equalizer and comparator means responsive to said reproduced digital signals for generating a pattern signal having a period which is a function of said relative speed;
said second switching means controlling said servo means when said error detecting means detects error in said reproduced clock signals in such a manner that said servo means adjusts said transport means in dependence on said pattern signal.

7. Apparatus according to claim 5; further comprising:
second switching means responsive to detection of error by said error detecting means; and
period detecting and acceleration/deceleration means for generating an acceleration or deceleration signal in response to said changes in said absolute tape speed;
said second switching means controlling said servo means when said error detecting means detects error in said reproduced clock signals in such a manner that said servo means adjusts said transport means in dependence on said acceleration or deceleration signal.

* * * * *